(12) United States Patent
Gordon et al.

(10) Patent No.: US 7,170,028 B1
(45) Date of Patent: Jan. 30, 2007

(54) CONTINUOUS METAL MATRIX COMPOSITE CONSOLIDATION

(75) Inventors: Brian L. Gordon, Wheeling, WV (US); Brian E. Joseph, Wheeling, WV (US); James F. Witzgall, Wheeling, WV (US)

(73) Assignee: Touchstone Research Laboratory, Ltd., Triadelphia, WV (US)

( * ) Notice: Subject to any disclaimer, the term of this patent is extended or adjusted under 35 U.S.C. 154(b) by 0 days.

(21) Appl. No.: 10/727,949

(22) Filed: Dec. 4, 2003

Related U.S. Application Data

(60) Division of application No. 10/247,185, filed on Sep. 19, 2002, which is a continuation-in-part of application No. 09/733,566, filed on Dec. 8, 2000, now Pat. No. 6,455,804.

(51) Int. Cl.
*B23K 26/00* (2006.01)

(52) U.S. Cl. .................................... 219/121.6

(58) Field of Classification Search ............. 219/121.6, 219/121.63, 121.64, 121.85, 121.73, 121.75, 219/601, 617
See application file for complete search history.

(56) References Cited

U.S. PATENT DOCUMENTS

| | | | | |
|---|---|---|---|---|
| 5,289,966 A | * | 3/1994 | Izumi et al. | 228/180.21 |
| 5,886,313 A | * | 3/1999 | Krause et al. | 219/121.6 |
| 5,968,671 A | * | 10/1999 | Joseph | 428/611 |
| 6,046,426 A | * | 4/2000 | Jeantette et al. | 219/121.63 |
| 6,455,804 B1 | * | 9/2002 | Gordon et al. | 219/121.64 |

* cited by examiner

*Primary Examiner*—Jonathan Johnson
(74) *Attorney, Agent, or Firm*—Philip D. Lane

(57) ABSTRACT

An apparatus for the fabrication of metal matrix composite structures comprising the continuous joining by brazing, soldering or welding of aluminum matrix tape using a laser to melt the surface of the tape while applying pressure to the tape and simultaneously contacting it with previously applied tape layers on a surface. The apparatus utilized to accomplish this fabrication process may include a variety of pre and post-contact heaters and preferably includes instruments for the continuous monitoring and control of the process.

10 Claims, 4 Drawing Sheets

CONTINUOUS METAL MATRIX COMPOSITE CONSOLIDATION

This application is a division of U.S. patent application Ser. No. 10/247,185 filed Sep. 19, 2002 and herewith which was a continuation-in-part of U.S. patent application Ser. No. 09/733,566 filed Dec. 8, 2000, now U.S. Pat. No. 6,455,804.

This invention was made with Government support under contract number F33615-99-C-5203 awarded by the Air Force. The Government has certain rights in the invention.

FIELD OF THE INVENTION

The present invention relates to methods and apparatus for the continuous consolidation of metal matrix composite materials and more particularly to methods and apparatus for the consolidation of aluminum matrix, ceramic, carbon or boron (among others) fiber reinforced metal matrix composites in prepreg tape form.

BACKGROUND OF THE INVENTION

The advantageous properties of metal matrix composites, especially aluminum matrix composites that incorporate ceramic or other reinforcing fibers are well known and recognized in the art and include high specific strength, high specific stiffness, maintenance of properties at extremes of high and low temperature and their resistance or lack of outgassing in a vacuum which is a major shortcoming of many competitive materials. These properties are of particular importance in aviation and space vehicle and structural applications. In fact, it has been estimated that the use of aluminum matrix composites of this type in, for example, launch vehicles could reduce their weight by as much as 30%, thus increasing their available payload by a like amount.

What is inhibiting the use of such materials in launch and similar vehicles, is a cost effective manufacturing method for the production of large structures from these materials. The provision of such a method would permit such applications for these materials and provide all of the accompanying attendant benefits to such use.

OBJECTS OF THE INVENTION

It is therefore an object of the present invention to provide a method for the manufacturing of structural members from aluminum metal matrix composites (AMCs).

It is another object of the present invention to provide a cost effective such manufacturing method.

It is yet another object of the present invention to provide apparatus for the implementation of such a manufacturing method.

SUMMARY OF THE INVENTION

According to the present invention, there is provided a method for the fabrication of AMC structures comprising the continuous welding or brazing of an aluminum matrix bare or braze-clad tape using an appropriate laser to melt the aluminum or the braze cladding on the tape while applying pressure to the tape and simultaneously contacting it with previously applied tape layers on a rotating mandrel. The apparatus utilized to accomplish this fabrication process may include a variety of pre and post-contact heaters and preferably includes instruments for the continuous monitoring and control of the process.

DETAILED DESCRIPTION

Figure 1:
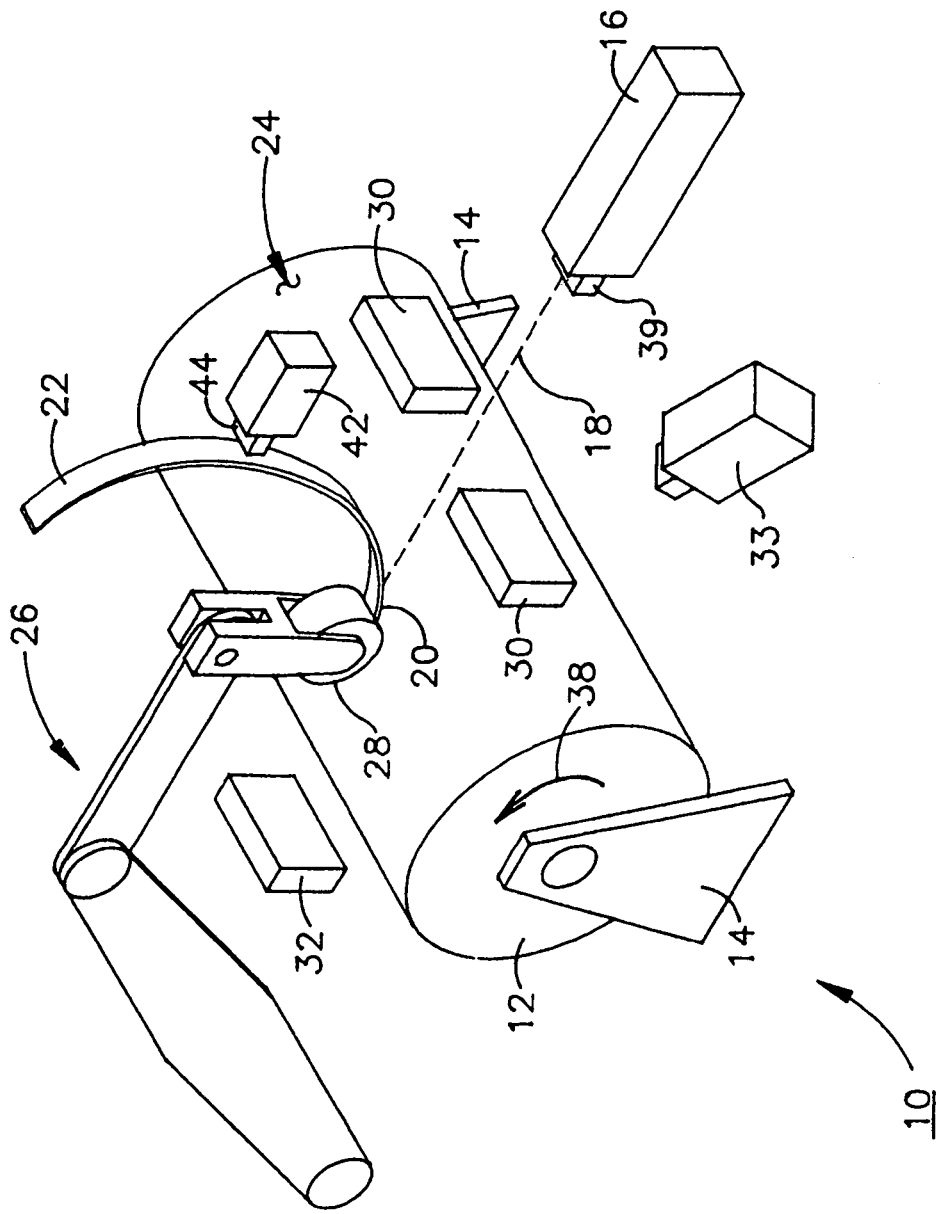
FIG. 1 is a schematic perspective view of apparatus suitable for the manufacture of AMC structures in accordance with the process of the present invention.

The present invention provides a method for the cost effective fabrication/manufacture of large structural members of aluminum metal matrix composites. The feedstock for the process is a metal matrix composite (OMC), specifically an aluminum matrix composite (AMC), in prepreg tape form comprised of alumina ($Al_2O_3$), some other appropriate ceramic, carbon, boron or even glass fibers in an aluminum/aluminum alloy matrix. The prepreg tape can be bare or coated with a "brazing" alloy, i.e. an aluminum alloy having a lower melting point than the aluminum matrix of the prepreg tape, prior to application in the process of the present invention. Fabrication is accomplished by applying the bare or braze material coated prepeg tape to a surface with the application of pressure while simultaneously melting the braze coating, solder coating or the surface of the bare metal, in the case of an uncoated tape, at the junction between the prepeg tape and the surface using a laser, preferably an infrared or diode laser that provides very limited and very localized heating and melting of the braze coat, solder coat or surface layer of aluminum. The laser beam of laser radiation preferably has a rectangular cross section to enhance heating efficiency in the area of the junction. Of course, an appropriate point source laser scanning at an appropriate rate could also be used. As will be seen from the detailed description that follows, a variety of pre and post-contact heaters and process control devices are preferably used to control and monitor the process. The braze-coated or solder coated feedstock just described can be prefabricated at a remote location and provided in coil form, or, as described hereinafter, can be prepared just prior to fabrication by coating the AMC prepreg with the braze coat or solder coat in line just prior to exposure to the laser radiation and application to the forming surface.

While any number of techniques such as spraying (thermal, arc, plasma, etc.), surface alloying, etc. can be used to apply the lower melting braze coating or solder coating to the prepreg tape, in the case where the braze coating or solder coating is applied in line with the consolidation operation, the prepreg tape is preferably guided through a pot of molten brazing or soldering, i.e. lower melting, metal, extracted from the pot of metal through a coating thickness control device such as a die or air knife, and then through a cooling chamber to solidify the coating. Preferably, the pot of molten metal is equipped with an ultrasonic pulse inducing element comprising a power supply, a transducer and a probe to facilitate coating of the matrix of the prepreg tape with the braze or solder coating. When used, the ultrasonic probe is inserted into the pot of lower melting molten metal it produces a cavitation field that results in pressure waves that reduce the contact angle and improve the wetting of the lower melting material to the prepreg. The ultrasonic probe also serves to disrupt any oxide film on the surface of the tape that might interfere with braze bonding. The cooling chamber can be highly sophisticated, but can be as simple a metal tube through which is flowed a chilled gas such as nitrogen and through which the braze or solder coated prepreg travels on exit from the coating pot and the thickness control device.

Referring now to FIG. 1, a preferred consolidation apparatus 10 of the present invention, comprises a rotating mandrel 12 supported on legs 14 (or any other suitable support system), a laser 16 that directs a beam of laser radiation 18 to the junction 20 between braze coated, solder coated or bare prepreg tape 22 and surface 24, a carriage unit 26 that supports and imparts lateral traversing motion to compaction wheel 28, pre-heaters 30 and post heater(s) 32. According to a preferred embodiment of the present invention, an optical pyrometer 33 can be used to monitor the temperature at junction 20 and the signal therefrom used to control either the mandrel rotation an/or carriage unit traverse speeds or the intensity of laser 16, to thereby control the temperature of the molten braze or solder coating 36 (see FIG. 2) or aluminum (see FIG. 3) that occurs at junction 20. While compaction wheel 28 is shown in FIG. 1 as rotating in a plane parallel to rotating mandrel 12, it will be apparent to those skilled in the polymer composites production arts, that compaction wheel 28 could traverse rotating mandrel 12 at right angles to the plane of rotation of rotating mandrel 12 and such an arrangement is clearly contemplated as within the scope of the appended claims.

Figure 2:
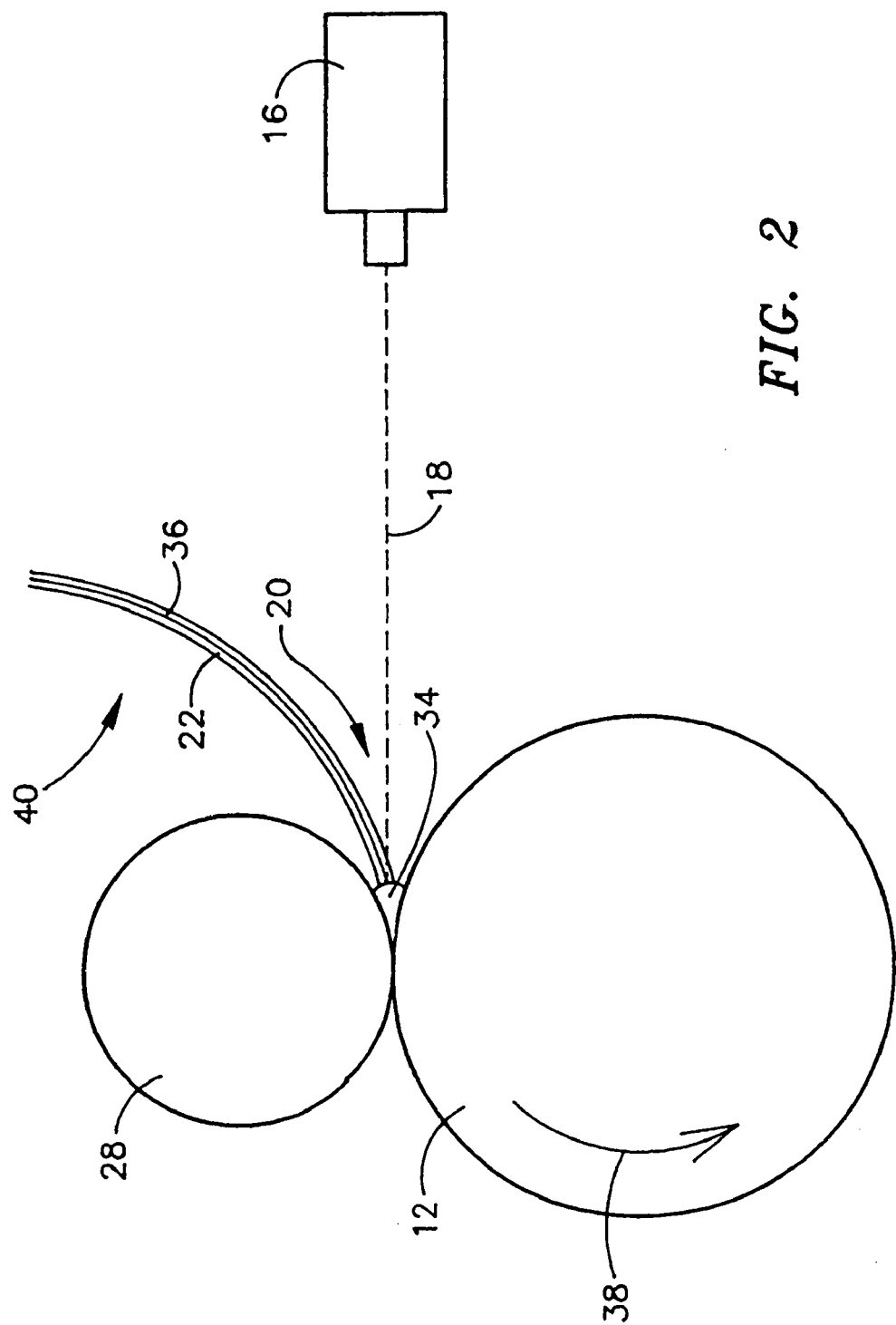
FIG. 2 is a schematic depiction of the area of contact between the mandrel surface, and the incoming prepeg tape at the point of application of infrared laser radiation in accordance with the process of the present invention.

Referring now to FIG. 2 that schematically depicts a side view of consolidation apparatus 10 and shows the relative positions of laser 16, laser beam 18, compaction wheel 28, mandrel 12 and incoming braze/solder-coated prepreg tape 22 at junction 20, it is readily observed that at junction 20, there exists a "front" of molten metal 34 that comprises the molten or liquid form of braze or solder coating 36 on prepreg tape 22. Front 34 is produced by the localized heating induced by the impact of laser beam 18 upon the surface of braze or solder coating 36. It must be noted, that although not specifically depicted in FIG. 2, surface 24 of mandrel 12 includes at least one wrap of previously applied prepreg tape 22 to which incoming feedstock prepreg tape 22 is adhered as braze coating 36 melts due to the localized and controlled heating action of laser beam 18, and subsequently cools as it is removed from the area of front 34 due to rotation of mandrel 12 in the direction shown by arrow 38 thereby building serial overlying layers of AMC joined to each other by alternating layers of braze or solder material 36. Simultaneously with the creation of front 34 and the movement of prepreg tape 22 in the direction indicated by arrow 38, compaction wheel 28 pushes prepreg tape 22, and consequently associated melted braze/solder coating 36, into intimate contact with surface 24 on mandrel 12 causing prepreg tape 22 to adhere firmly thereto. The specific conditions under which such fabrication can occur are described in greater detail hereinafter.

Consolidation apparatus 10 fundamentally comprises a 2-axis filament winder of the type used in the fabrication of polymer matrix composites. According to a preferred embodiment, mandrel 12 can be up to 48 inches long and up to about 36 inches in diameter. Of course, larger dimensioned devices can be used in those cases where larger structural members are being fabricated. The rotational movement of mandrel 12 and the linear traverse of compaction wheel 28 on carriage unit 26 are controlled and coordinated by means of "Pattern Master" software or the like that are supplied with the filament winder unit, or custom deigned and implemented if a specific non-standard wrap pattern is required or desired.

Laser 16 preferably comprises a stacked multi-bar infrared laser but may comprise any suitably powered laser such as a visible light, UV, etc. laser that obtains the localized melting required for the successful practice of the present invention. An array of optical lenses 38 are prefereably used to shape laser beam 18 into a rectangular pattern that matches the cross-sectional dimension of prepeg tape 22. According to a preferred embodiment of the invention, laser 16 is powered by a DC power supply capable of delivering 75 amps or more to the preferred stacked multi-bar diode laser 16. Laser 16 in this configuration is designed to operate in a continuous wave mode at a power of up to 500 watts or more. In the embodiment depicted in FIG. 3 wherein a separate braze coating layer is not applied but rather a slightly thicker (by perhaps one or two thousandths of an inch) of metal that forms the matrix is used, a higher power laser is necessary due to the generally higher melting point of the matrix material as compared to the applied braze or slder coating described herein. Thus, for alternative such processes it is preferred that the laser exhibit a power of between about 100 and about 1500 watts and preferably between about 500 and about 1000 watts. Water cooling of the laser head is required to maintain the life of the diodes and is conventionally accomplished by means of a water-to-air chiller unit (not shown). Multi-bar diode lasers of this type are commercially available from Opto Power Corporation, 3321 E. Global Loop, Tucson, Ariz. 85706.

Mandrel 12 must, of course be collapsible or otherwise removable once the finished structure is completed by completion of the wrapping operation. Similarly, surface 24 of mandrel 12 should be of a material that will resist adhesion to melted and cooled braze coating 36, or matrix metal when performed as described in connection with FIG. 3, and simultaneously minimize conductive heat loss from the parts during fabrication to provide better and more accurate process control, although in the latter case, alternative process controls may be used to minimize the effects of the material on surface 24 on the brazing/welding process. In one embodiment of the present invention, a suitable ceramic tube fabricated from shale and fire clay was cut into three segments and attached to a chuck arrangement to allow for expansion and contraction.

Figure 3:
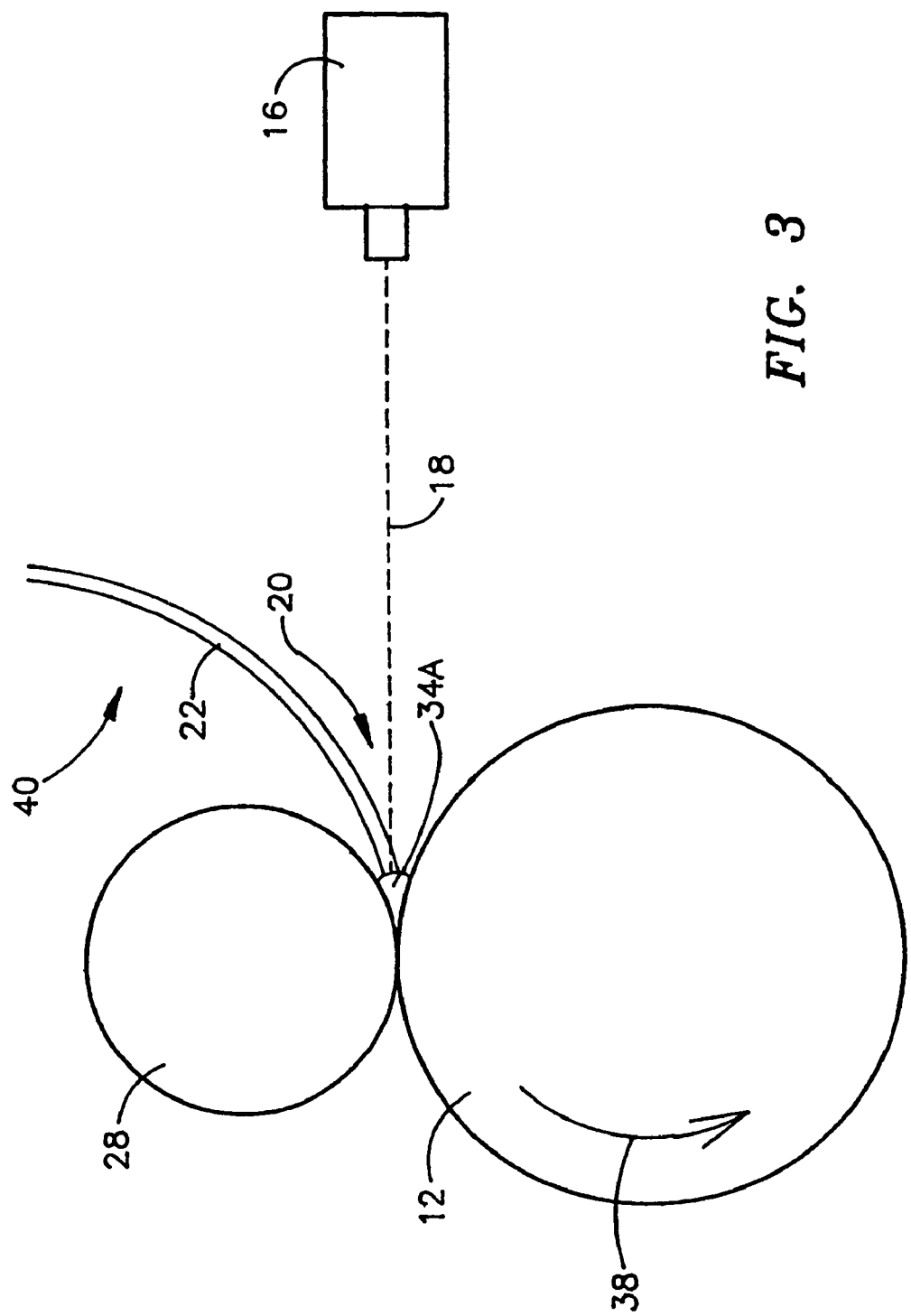
FIG. 3 is a schematic depiction of the area depicted in FIG. 2 except under the preferred alternative condition where the prepeg tape is not braze coated prior to consolidation.

Referring now to FIG. 3, it is to be noted that the only fundamental between the embodiment depicted therein and in FIG. 2 is that in the embodiment depicted in FIG. 3 no braze coating 36 and consequently brazing or soldering material front 34 is present, rather a matrix material front 34A that is in effect a weld bead of molten matrix material derived from both opposing surfaces of prepreg tape 22 is formed to consolidate the sequentially applied layers of prepreg tape 22 as mandrel 12 is rotated. Of course, in such an instance, no mechanism is required for the application of braze coating 36. In all other respects, except those specifically differentiated hereinabove and below, the method and apparatus of this embodiment are similar to that of the previously described embodiment wherein a brazing or solder layer is utilized. In the embodiment depicted in FIG. 3, it is fair to characterize the layer bonding process as one of laser welding of the sequentially applied layers of prepreg tape 22.

As shown in FIG. 1, immediately after junction 20 prepreg tape 22 is contacted on its reverse side 40 by compacting wheel 28 to accomplish consolidation. As with surface 24 of mandrel 12, compacting wheel is preferably fabricated from a low thermal conductivity material, such as an insulating ceramic material, to minimize conductive heat loss from junction 20 during consolidation. A highly preferred material for compaction wheel 28 is zirconium phosphate which exhibits these and other suitable properties. Of course, suitable alternative process controls can make the selection of materials for compaction wheel 28 less critical. Compaction wheel 28 is arranged to ride at top dead center of mandrel 12 and is guided in its movement by carriage assembly 26. Compaction wheel 28 in addition to providing compressive energy for consolidation also has a second important function, in that it provides a V-shaped cavity at junction 20 thereby reducing reflective losses by trapping some of the infrared radiation of beam 18 and creating a "multiple bounce" situation where most of the incoming radiation is used for heating and less of such radiation is lost due to reflection from the various surfaces at junction 20.

Preheat lamps 30, and where used post heat lamp(s) 32 preferably comprise reflector lamps as line sources of infrared energy to preheat or post heat prepeg tape 22 prior to or after exit from junction 20. Preheat lamps 30 preferably heat prepeg tape 22 to a temperature of about 500° F. in order to reduce the heating load on laser 16. As will be obvious to the skilled artisan, such preheating may not be required if a higher powered laser is used. Post heating lamp(s) 32 are similarly configured, and if and where applied can be used to control the cool down of prepeg tape 22 as it exits junction 20 to reduce the thermal stresses that may be induced by the brazing/welding process.

According to another alternative preferred embodiment of the present invention, a rotary ball vibrator 42 that induces vibration in the range of from about 1000 to about 25000 vibrations per minute is added to consolidation apparatus 10 to provide a more thorough mixing of molten braze alloy front 34 at junction 20. Rotary ball vibrator 42 is attached to a metal rod 44 that contacts prepreg tape 22 just before it enters junction 20. The presence of rotary ball vibrator 42 causes prepreg tape 22 to vibrate at the same frequency as vibrator 42 which in turn induces oscillations in front 34 at junction 20. Thus, these oscillations occur in junction 20 as prepreg tape 22 is addressed by compaction wheel 28.

According to yet another alternative preferred embodiment of the present invention, a flow of inert gas is applied over the heated area at junction 20 to minimize the formation of oxides in front 34 during brazing/welding. Free flowing argon, nitrogen or the like inert gas directed to the area of junction 20 appears to provide such benefit.

Optical pyrometer 33 may be included to provide temperature feedback information to the control circuits of laser 16 thereby assuring that the appropriate amount of heat is being applied at junction 20 to achieve satisfactory melting of braze coating 36, or welding in the non-braze coated embodiment, and consolidation as described above.

Finally, at least in process development and refinement situations, it can be desirable to include a video camera (not shown) to closely monitor the area of junction 20 to obtain the appropriate operating parameters for a specific given prepreg tape 22 and braze coating 34 composition.

In practice, the method of the present invention is carried out using the above-described apparatus 10 by first wrapping an initial turn of a suitable prepreg tape of, for example, pure aluminum, 1100 alloy aluminum or any other suitable aluminum, titanium, magnesium etc. metallic matrix containing a ceramic reinforcing material, for example, Nextel 610™ aluminum oxide 1500 denier fibers commercially available from the 3M Corporation, Minneapolis, Minn. According to a specifically preferred embodiment of the present invention the prepreg tape, whatever its composition, is about 0.5 inches wide, 0.015 inches thick with a rectangular cross section about mandrel 12. Prepreg tape 22 is provided as a coil on a payoff for continuous feeding. Consolidation apparatus 10 is then activated. Mandrel 12 begins to turn, laser 16 is focused on junction 20 and prepreg 22 is fed into junction 20 for consolidation by compacting wheel 28. The specific process conditions are largely a matter of choice as dictated by the materials being consolidated (the AMC matrix alloy and the braze coating composition), the power of laser 16, the rotational speed of mandrel 12 etc. However, in the case of fabrication of the above-described prepeg tape bearing braze coatings of the types referred to in the examples below, melting temperatures in the range of from about 375 to about 1200° F. produced by a suitable laser operating at between about 100 and about 1500 watts (or even higher power in the case of wider tape) and prepreg tape feed rates on the order of between about 0.65 and 1.50 inches/sec. have been found useful and appropriate. In the case where the prepreg tape 22 bears no braze or solder coating 36, the power of the laser may be required to be significantly higher, for example, 500 to several tens of thousands watts, perhaps 50,000 watts, particularly in the case of wide tapes.

Figure 4:
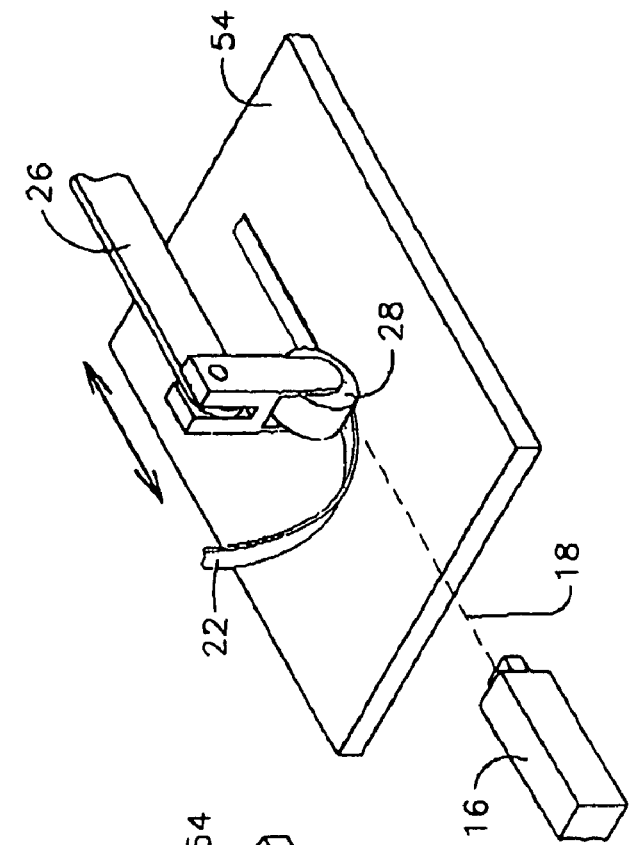
FIG. 4 is a schematic depiction of an alternative embodiment of apparatus suitable for the practice of the present invention.

Referring now to FIG. 4 that depicts an alternative apparatus configuration for the successful practice of the present invention 50, mandrel 12 may be replaces with a planar surface 52 of a composition similar to that previously described for mandrel 12 and a shoe 54 substituted for compaction wheel 28. Shoe 54 comprises a material similar to that described as suitable for compaction wheel 28. In this configuration, tape 22 is introduced between shoe 54 and surface 52 to provide a junction 56 into which laser beam 18 produced by suitable laser 16 is impacted to provide the required melting of the braze, solder or matrix material as previously described. Shoe 54 translates across surface 54 through the translational action of carriage unit 26, similar to carriage unit 26 in FIG. 1.

Figure 5:
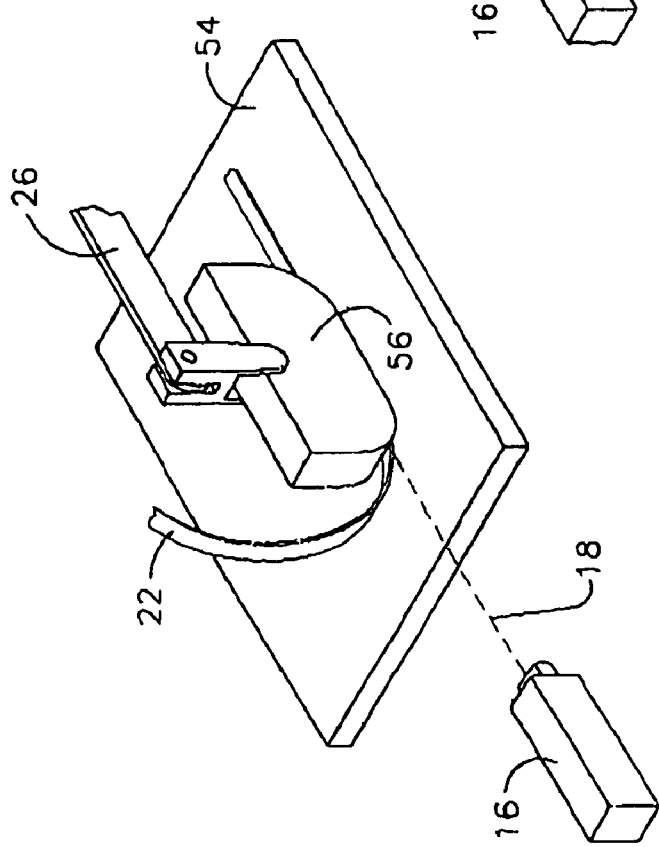
FIG. 5 is a schematic depiction of yet another alternative embodiment of apparatus suitable for the practice of the present invention.

FIG. 5 provides a schematic depiction of yet another alternative embodiment of apparatus suitable for the successful practice of the present invention. In the case shown in FIG. 5, apparatus 60 comprises a planar surface 24 similar in composition to that of mandrel 12 and a compaction wheel 28 substantially as previously described. Again, tape 22 is introduced at the junction 56 between tape 22 and surface 54 and laser beam 18 produced by suitable laser 16 impacted therein to produce the requisite fusing or melting of the braze, solder or matrix material required for adhesion of sequentially applied layers as previously described.

EXAMPLES

The following examples when considered in conjunction with the foregoing detailed description will serve to better illustrate the successful practice of the present invention.

Examples 1–4

Prepeg tapes comprising Nextel 610% fibers in pure aluminum were consolidated as described hereinabove using the following braze coatings and under the following tabularly presented operating conditions:

| Braze Coating | Braze Temperature | Laser Power | Tape Feed Rate |
| --- | --- | --- | --- |
| 1) 96.5 Sn/3.5 Ag | 430–500° F. | 426 Watts | 0.70 inches/sec. |
| 2) 70 Sn/30 Zn | 389–707° F. | 110 Watts | 1.06 inches/sec. |
| 3) 84 Zn/11 Al/5 Cu | 715–845° F. | 268 Watts | 0.87 inches/sec. |
| 4) 88 Al/12 Si | 1070–1220° F. | 373 Watts | 1.27 inches/sec. |

Under each of the foregoing conditions, satisfactory consolidated round structural shapes of the prepeg material indicated were fabricated.

There has thus been described a method and apparatus for the fabrication of metal matrix structures by the sequential application of layers of metal matrix tape of a variety of sizes and compositions through the controlled fusing of brazing or solder layers applied to the tape or the metal matrix of the metal matrix tape.

As the invention has been described, it will be apparent to the skilled artisan that the same may be varied in many ways without departing from the spirit and scope of the invention. Any and all such modifications are intended to be included within the scope of the appended claims.

What is claimed is:

1. An apparatus for the fabrication of structural members of metal matrix composites comprising:
   a surface;
   a carriage mechanism;
   a compaction device attached to said carriage mechanism so as to permit controlled translational and lateral movement of said compaction device across said surface;
   a metal matrix composite prepreg tape feeding mechanism that supplies metal matrix composite prepreg tape that addresses said surface to a junction between said surface and said compaction device as said metal matrix composite prepreg tape enters said junction; and
   a laser generating a laser beam that impacts said metal matrix composite prepreg tape in said junction causing at least a surface of said metal matrix composite prepreg tape to fuse as said metal matrix composite prepreg tape passes under said compaction device.

2. The apparatus of claim 1 wherein said metal matrix composite prepreg tape comprises a matrix of aluminum or an aluminum alloy encompassing fibers selected from the group consisting of carbon, boron, ceramic and glass fibers.

3. The apparatus of claim 1 said laser comprises a stacked multi-bar infrared laser.

4. The apparatus of claim 3 wherein said stacked multi-bar infrared laser includes optical lenses that shape the infrared beam into a pattern that matches the cross sectional dimensions of said metal matrix composite prepreg tape.

5. The apparatus of claim 1 wherein said surface and said compaction device both comprise the same or different ceramic materials.

6. The apparatus of claim 1 further including preheaters that heat said metal matrix composite prepeg tape prior to entering said junction.

7. The apparatus of claim 6 wherein said preheaters comprise infrared reflector lamps.

8. The apparatus of claim 1 further including an optical pyrometer that addresses said junction and views said metal matrix composite prepeg tape in said junction and provides temperature feedback information for controlling the power of said laser or the relative movement of said surface and said compaction device.

9. The apparatus of claim 1 further including a mechanism for inducing vibratory energy to said prepeg tape prior to entry into said junction at a frequency of between about 1000 and 25000 vibrations per minute.

10. The apparatus of claim 1 wherein said surface is a planar surface.

* * * * *